United States Patent [19]

Brane et al.

[11] 3,797,523

[45] Mar. 19, 1974

[54] LOW PRESSURE DROP WATER SOFTENER VALVE ASSEMBLY WITH DUAL PISTONS

[76] Inventors: Earl P. Brane, 9470 Ulmerton Rd.; Douglas K. Brane, 280 Fourth St., N.W., both of Largo, Fla. 33540; Robert E. Marsh, 5521 Willow View, Racine, Wis. 53402; Hilton H. Hammond, 6644 Gulfport Blvd., St. Petersburg, Fla. 33707

[22] Filed: Sept. 11, 1972

[21] Appl. No.: 288,116

[52] U.S. Cl. ............... 137/599.1, 210/141, 210/191
[51] Int. Cl. ............................................. B01d 29/38
[58] Field of Search ......... 137/599.1; 210/139, 140, 210/141, 190, 191

[56] References Cited
UNITED STATES PATENTS

| | | |
|---|---|---|
| 2,744,867 | 5/1956 | Webb .................................. 210/140 |
| 3,083,728 | 4/1963 | Schulze et al. ..................... 137/599.1 |
| 3,181,564 | 5/1965 | Rudelick ............................ 137/599.1 |
| 3,460,566 | 8/1969 | Heartstedt .................... 137/599.1 X |

Primary Examiner—Robert G. Nilson
Attorney, Agent, or Firm—Woodard, Weikart, Emhardt & Naughton

[57] ABSTRACT

A water softener valve assembly for directing water flow for the softening of water and for the regeneration of the water softener tank. A housing has a pair of slidably mounted pistons which are movable to open and closed positions directing the flow of water. In the open position, the incoming hard water is directed to the soft water tank with a minimum length of travel and bends. Subsequent to the softening, the water is directed through the assembly and to the user. Various control valves are provided for directing brine into the water softener tank and for refilling the brine tank with water for regeneration of the water softener tank. During regeneration, the incoming hard water is directed through a bypass passage and immediately to the outlet in a hard condition preventing interruption of water flow to the user. Control valves are provided for controlling the movement of the pair of pistons.

8 Claims, 7 Drawing Figures

LOW PRESSURE DROP WATER SOFTENER VALVE ASSEMBLY WITH DUAL PISTONS

BACKGROUND OF THE INVENTION

1. Field of the Invention:

This invention is in the field of water softener valves.

2. Description of the Prior Art:

Many of the prior art water softener valves require the incoming water to be routed through a plurality of bends and passages and as a result, a large pressure drop exists between the incoming hard water and the outgoing soft water. Disclosed herein is a water softener valve assembly which has a pair of pistons positioned immediately adjacent the inlet and outlet of the valve assembly in such a way so as to minimize the number of bends required to route the water to the water softener tank with the pressure drop therefore being minimized. Another of my water softening valves is disclosed in my U.S. Pat. No. 3,348,574.

SUMMARY OF THE INVENTION

One embodiment of the present invention is a water softener valve assembly comprising a housing having a first chamber and a second chamber each with a first end and an opposite end, the housing having a first passage leading from the first end of the first chamber to a water softener tank, a second passage leading from the water softener tank to the second chamber, a bypass passage leading from the first chamber to the second chamber, a hard water inlet opening into the first chamber, a soft water outlet opening into the second chamber, a third control passage leading from the opposite end of the first chamber, and a fourth control passage leading from the opposite end of the second chamber, a bypass valve mounted on the housing and projecting into the bypass passage being movable to and from a position blocking water flow in the bypass passage and another position allowing water flow in the bypass passage, a first piston mounted in the chamber and slidable to and from an open and closed position, the first piston having an end with a first seal and another end with a second seal mounted thereon, the hard water inlet and the bypass passage open into the first chamber between the first seal and the second seal, the first seal sealingly engages the first end of the first chamber when the first piston is in the closed position preventing water flow into the first passage, first means mounted on the housing operable to move the first piston to and from its opened and closed positions, a second piston mounted in the second chamber and slidable to and from opened and closed positions, the second piston having an end with a third seal and another end with a fourth seal mounted thereon, the soft water outlet and the bypass passage open into the second chamber between the third seal and the fourth seal, the third seal sealingly engages the first end of the second chamber when the second piston is in its closed position, and second means mounted on the housing operable to move the second piston to and from its open and closed positions.

It is an object of the present invention to provide a new and improved water softener valve.

It is a further object of the present invention to provide a water softener valve which minimizes the pressure drop between the incoming hard water and outgoing soft water.

In addition, it is an object of the present invention to provide a water softener valve assembly having a pair of controllable pistons for directing the water.

Related objects and advantages of the present invention will be apparent from the following description.

DESCRIPTION OF THE PREFERRED EMBODIMENT

Figure 1:
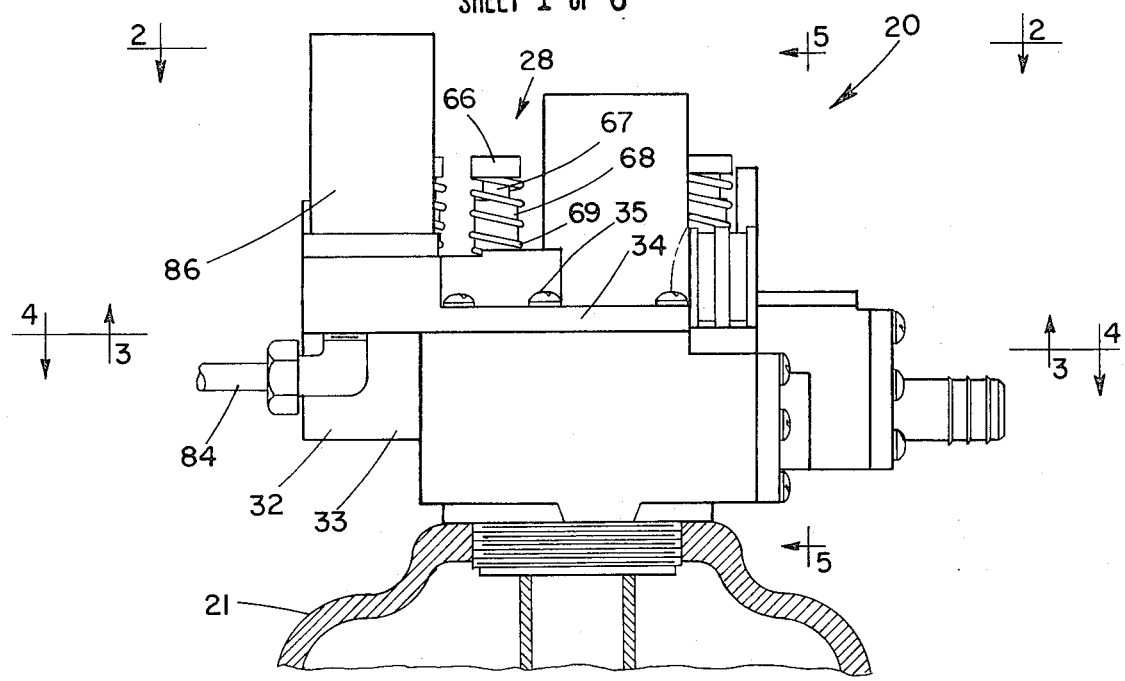
FIG. 1 is a fragmentary side view of a valve assembly incorporating the present invention shown mounted to a water softener tank.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
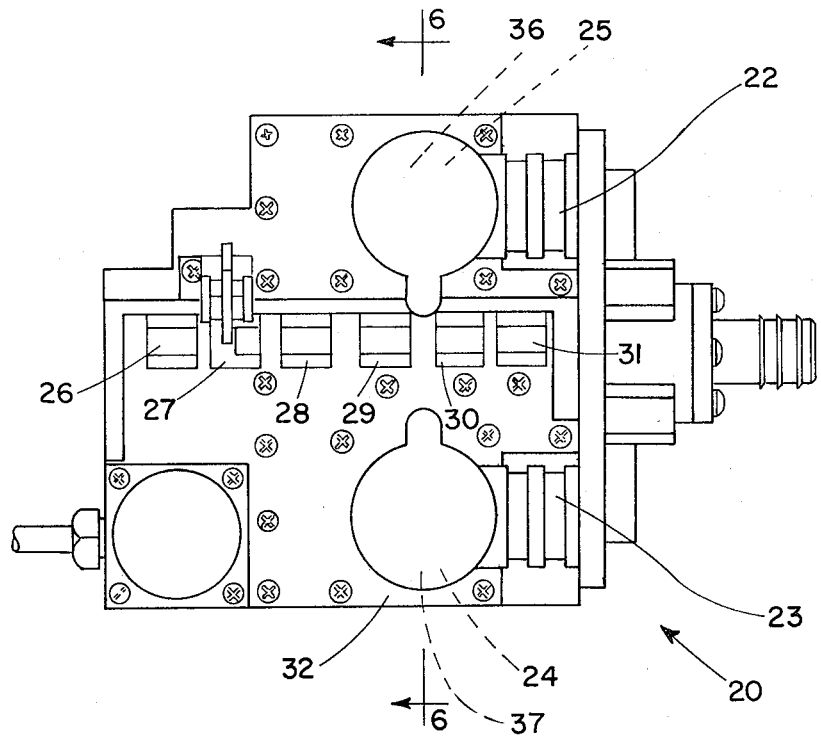
FIG. 2 is a top view of the assembly of FIG. 1 viewed in the direction of arrows 2—2.

Referring now more particularly to FIGS. 1 and 2, there is shown a water softener valve assembly 20 which is mounted atop water softener tank 21. The valve assembly directs the incoming hard water which is received through the hard water inlet 22 into tank 21 where the hard water is placed in a softened condition. The soft water then exits tank 21 and passes through the valve assembly exiting the assembly at soft water outlet 23. The valve assembly is provided with a pair of pistons 24 and 25 along with six control valves 26 through 31 enabling the materials within the water softener tank to be regenerated. During the regeneration, the hard water entering inlet 22 is routed directly to outlet 23 thereby preventing interruption of water flow to the user doing the regeneration. The regeneration includes the steps of first backwash, brine and rinse, second backwash, purge and brine refill. This valve also can be changed so that either first backwash can be eliminated or second backwash can be eliminated. This is a desirable feature in certain water conditions.

Figure 3:
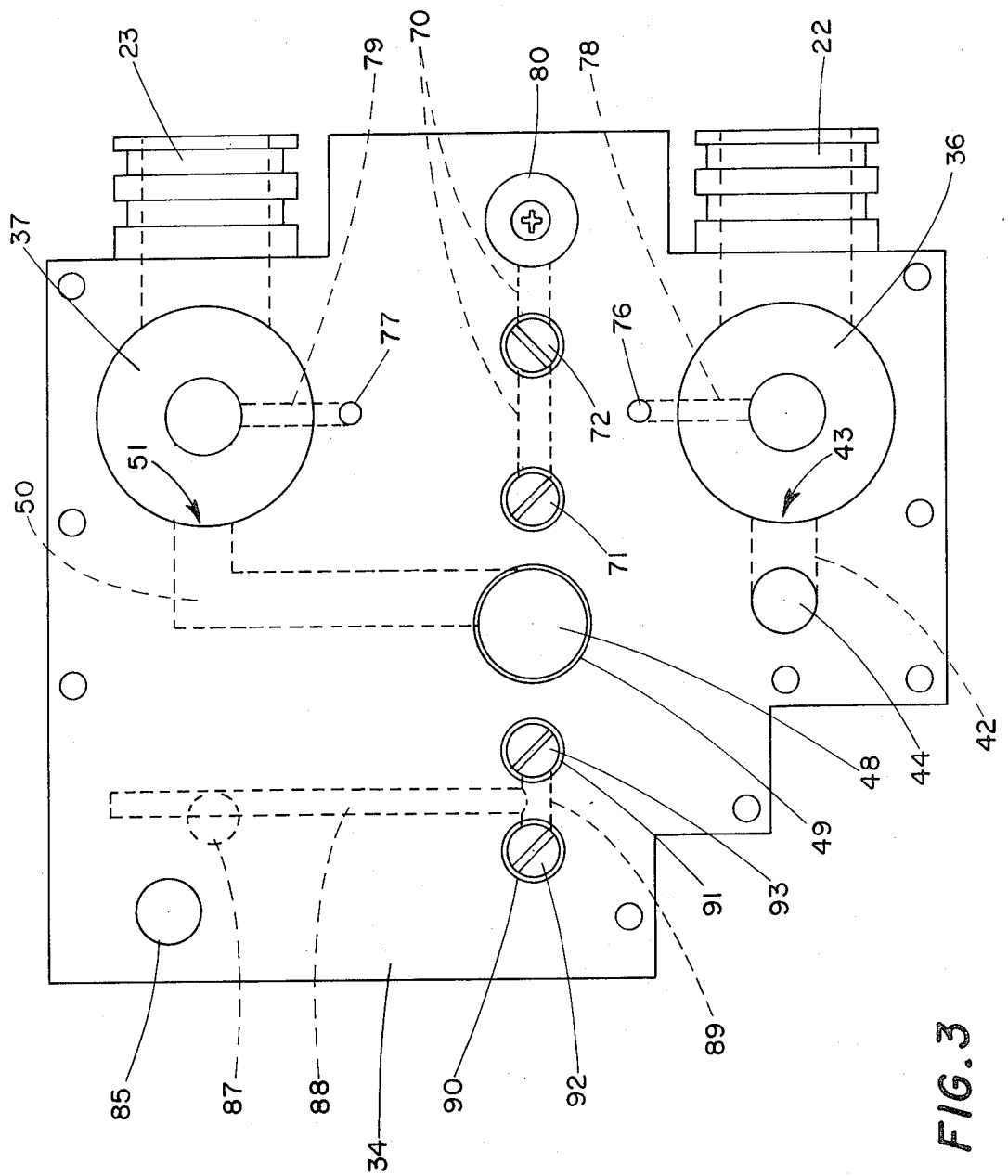
FIG. 3 is an enlarged cross sectional view taken along a line and viewed in the direction of arrows 3—3 of FIG. 1.
Figure 6:
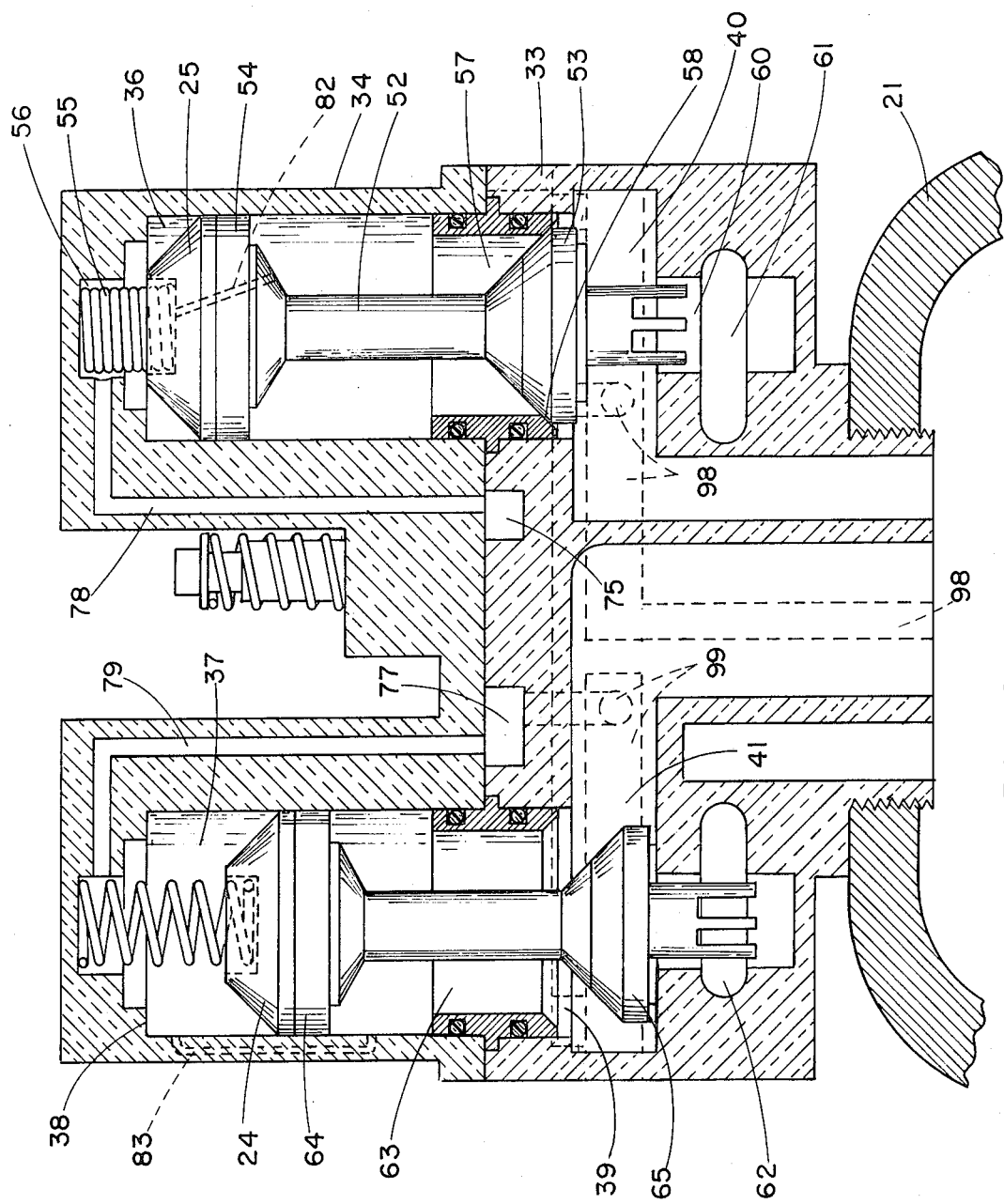
FIG. 6 is an enlarged cross sectional view taken along the line 6—6 of FIG. 2 and viewed in the direction of the arrows.
Figure 7:
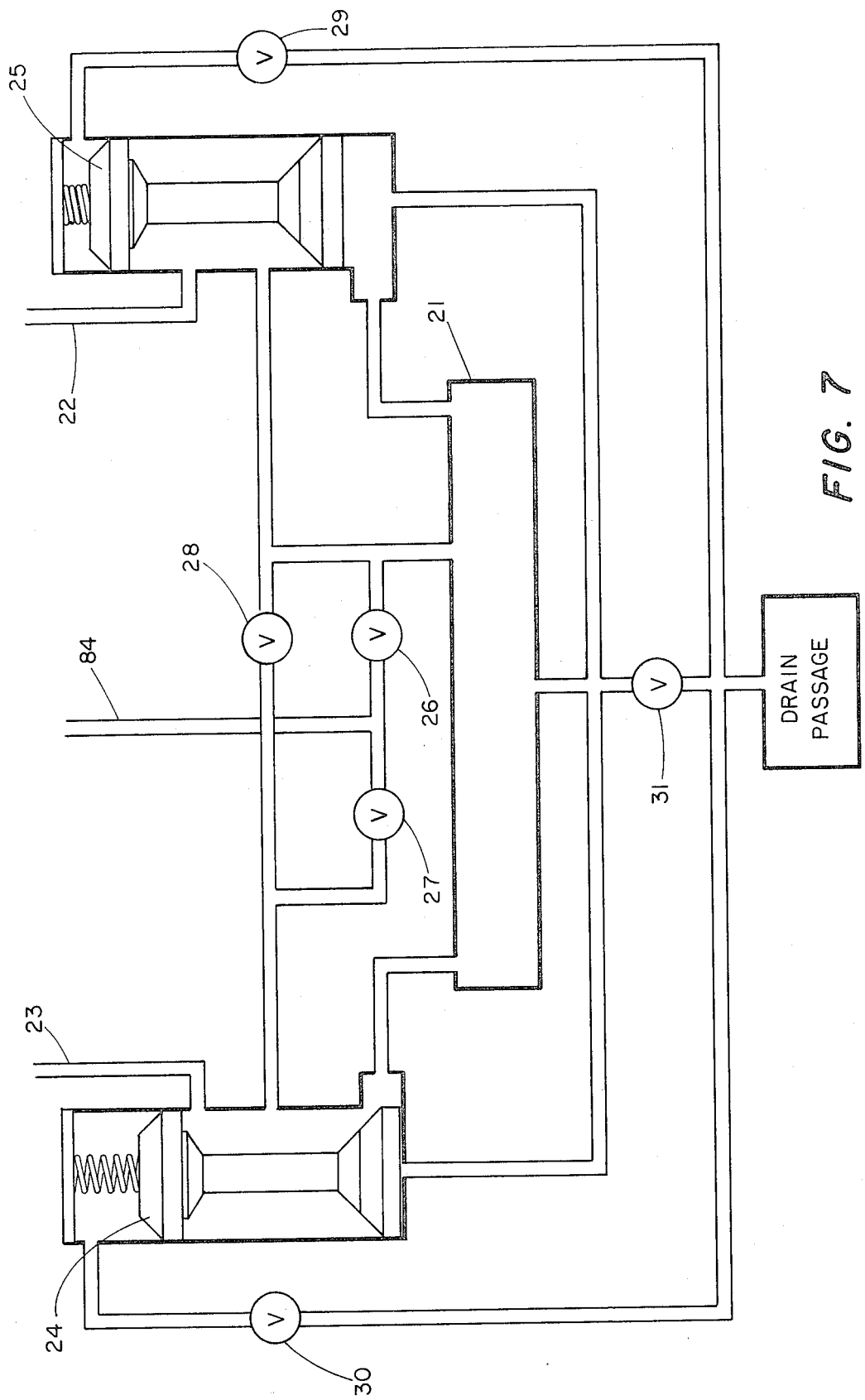
FIG. 7 is a schematic diagram showing the various valves and their related fluid interconnections.

The valve assembly has a main housing 32 which is composed of a bottom portion 33 and a top portion 34 sealingly secured together by conventional fasteners 35. The top portion 34 of housing 32 has a first chamber 36 and a second chamber 37 which house respectively piston 25 and piston 24. FIG. 6 is a cross sectional view of the housing showing chambers 36 and 37 as well as pistons 25 and 24. It will be noted that each chamber 36 and 37 has a top end and a bottom end. For example, chamber 37 has a top end 38 and a bottom end 39. A passage 40 leads from the bottom end of chamber 36 to the water softener tank 21. The hard water inlet 22 opens directly into chamber 36 as shown in FIGS. 2 and 3. Thus, the hard water enters the valve assembly through inlet 22 passing into chamber 36 and then down into passage 40 where it is routed to the soft water tank 21. It is desirable to direct the incoming hard water to the water softener tank in the shortest distance with a minimum number of bends. Likewise, it is desirable to direct the soft water out of the tank and through the valve assembly to the outlet 23 in the minimum distance and the least amount of bends so as to minimize the pressure drop existing between the hard water entering the system and the soft water exiting the system. The valve assembly disclosed herein achieves the softening with a minimum of pressure drop. It will be noted that chambers 36 and 37 are straight without bends. Further, passage 40 has a maximum of one bend between chamber 36 and the water softener tank. Likewise, passage 41 has a maximum of one bend between the soft water tank and chamber 37. The soft water exits tank 21 via passage 41 and then enters chamber 37 exiting the valve assembly through outlet 23. In one embodiment of the valve assembly disclosed herein the assembly provided soft water at a flow rate of twenty-three gallons per minute with a fifteen pound pressure drop. Other water softener valve assemblies which do not incorporate the invention disclosed herein provide only seven and one-half gallons per minute with the same pressure drop. The lower flow rate is a result of additional bends and lengths of travel as compared to the passage design described herein.

Pistons 24 and 25 are shown respectively in the opened and closed position. In order to route the incoming hard water through the water softener tank, both pistons 24 and 25 would be in the opened position or the most downward position as piston 24 is shown in FIG. 6.

Figure 4:
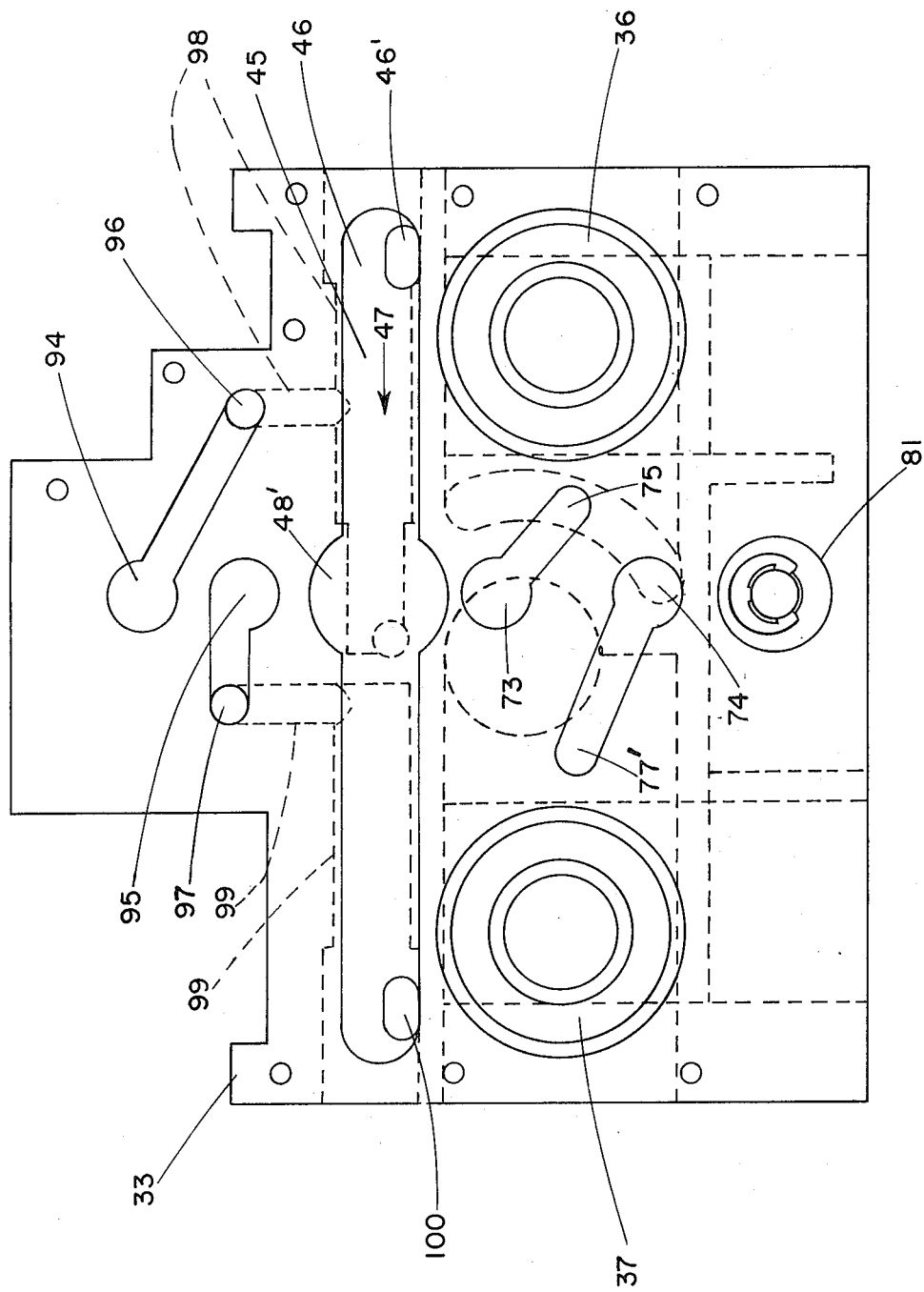
FIG. 4 is an enlarged cross sectional view taken along a line and viewed in the direction of arrow 4—4 of FIG. 1.

A bypass passage is provided which leads from chamber 36 to chamber 37. The hard water is directed through the bypass passage and routed directly through chamber 37 and out outlet 23 without softening during the regeneration cycle. Thus, water service is not interrupted to the user. The bypass passage 42 (FIG. 3) opens into the inlet chamber 36 through hole 43. The bypass passage 42 then passes through hole 44 of the top portion 34 of the housing which is aligned with groove 45 of the bottom portion 33 of the housing. Hole 44 is aligned with end 46 of groove 45 with the water then flowing in the direction of arrow 47 to an enlarged area 48' of the groove. Of course, to force the incoming hard water through hole 43 and into the bypass passage 42, piston 25 must be in the upward sealed condition thereby preventing flow of water into passage 40 (FIG. 6). Bypass control valve 28 is opened with head 48 (FIG. 3) of the bypass valve projecting into the enlarged area 48' of the bypass passage 45 (FIG. 4). The incoming hard water is therefore routed into cavity 49 which houses piston 48. Cavity 49 is in communication with another passage 50 (FIG. 3) which enters chamber 37 through hole 51 provided in the side wall of chamber 37. The hard water then exits chamber 37 via outlet 23. Bypass valve 28 is movable from the open position to a closed position so as to block the water flow in the bypass passage.

Pistons 24 and 25 are identical and thus, the following description of piston 25 will apply equally to piston 24. Piston 25 (FIG. 6) includes a rod 52 having a first resilient seal 53 mounted fixedly to its bottom end and a second resilient seal 54 mounted to its top end. Seal 54 is in constant engagement with the side walls of chamber 36. The top end of piston 52 is provided with a cavity for receiving one end of a helical spring 55 which has its opposite end positioned in cavity 56. A cylindrical insert 57 is positioned in cavity 36 and extends sealingly on either side of the junction between the top portion 34 and the bottom portion 33 of the housing. The upper surface 58 of seal 53 is tapered and is complimentary to the bottom end of insert 57. Thus, when the piston is in the upward position as shown in FIG. 6, water is prevented from flowing from the top portion of chamber 36 through insert 57 to passage 40. Likewise, when the piston is in the downward position, seal 53 is in sealing engagement with hole 60 thereby preventing water flow from passage 40 to passage 61 which will be described later in this specification. The helical springs normally urge the pistons to the downward position as shown for piston 24.

The hard water inlet 22 and bypass passage 42 open into chamber 36 between seals 53 and 54. Piston 24 is also slidably mounted and is movable from an open to a closed position. In the open position as shown in FIG. 6, the bottom seal of the piston prevents water flow from passage 41 to passage 62 which will be described later in this specification. When piston 24 is in the closed position with the bottom seal 65 engaging insert 63, water flow is prevented from passage 41 into chamber 37. The soft water outlet 23 and passage 50 open into chamber 37 between the top seal 64 and bottom seal 65 of the piston.

Means are provided for operably moving pistons 24 and 25 to and from their open positions and closed positions. The means for each piston include the helical springs which have been discussed, pressure equalizing passages, control valves, and control passages. Control valves 26 through 31 are fixedly mounted to the top portion 34 of the housing (FIG. 2). Each control valve includes a head fixedly mounted to a piston rod which extends into a cylindrical boss secured to the housing. For example, control valve 28 (FIG. 1) includes a head 66 which is fixedly mounted to rod 67 which is slidably mounted to cylindrical boss 68 fixedly mounted to housing 32. A helical spring 69 urges head 66 to the upward position. A cam or other suitable device is utilized to move piston 28 downwardly. Likewise, additional cams are provided for moving control valves 26 through 31 to a downward position with a spring being utilized to return the control valves to their most upward position. Since the main pistons 24 and 25 are pilot operated by the smaller control valves 26–31, a small electric motor may be utilized to turn the cams which move valves 26–31. A controller with such an electric motor is disclosed in my copending U.S. patent application entitled PROGRAMMER GEAR DEVICE WITH SLIDABLE ACTUATOR BAR, Ser. No. 256,172. Other prior art devices using a direct operation in lieu of the pilot operation are required to use larger motors to operate any valves. The rod of each piston extends through the top portion 34 of the housing having a piston secured to its lower end. For example, piston 48 (FIG. 3) is fixedly secured to rod 67. Control valve 29 is provided for controlling the movement of piston 25 whereas control valve 30 is provided for controlling the movement of piston 24.

Passage 70 (FIG. 3) interconnects the cavities which receive pistons 71 and 72 respectively fixedly mounted to the piston rods of valves 29 and 30. A pair of cavities 73 and 74 (FIG. 4) are formed in the bottom portion 33 of the housing and respectively receives pistons 71 and 72 when pistons 71 and 72 are forced to the downward position. Cavity 73 is elongated and has an end 75 positioned immediately adjacent and communicating with hole 76 (FIG. 3) formed in the top portion 34. Likewise, cavity 74 is elongated and has an end 77' positioned immediately adjacent and communicating with hole 77 (FIG. 3). Holes 76 and 77 are respectively the bottom ends of passages 78 and 79 which have top ends opening respectively into chambers 36 and 37. Passage 70 (FIG. 3) also opens into hole 80 which is positioned immediately adjacent and communicating with hole 81 formed in the bottom portion 33. Hole 81 leads to a drain passage. Thus, by forcing valve 29 to the downward position, thereby forcing piston 71 into cavity 73, water is allowed to flow from chamber 36 through control passage 78 and into cavity 73. Water flowing from cavity 73 then flows into the cylindrical cavity in which piston 71 is positioned and then subsequently into passage 70, hole 80 and to the drain passage. Water pressure is thereby taken from the top side of piston 25 with the water pressure from the incoming water from inlet 22 forcing the piston to the upward position. On the other hand, by closing valve 29, water flow through passage 78 is prevented with the result that water pressure is equalized on both sides of seal 54 allowing spring 55 to force the piston 25 to the downward position. Means are provided for allowing water flow from the bottom side of seal 54 to the top side of seal 54. This may be accomplished either by providing an equalizing passage 82 through the top head of piston 25 or alternatively providing an equalizing passage 83 or groove in the side wall of the chamber receiving the piston such as shown for chamber 37. Thus, water pressure is allowed to equalize on both sides of the piston. A quick removal of the water from the top side of the piston however, will result in the piston moving to the upward position. After the control valve has been closed, the water pressure will eventually equalize on both sides of the top portions of the pistons allowing for the piston to be moved to the downward position.

Piston 24 is operated in a manner similar to that described for piston 25. That is, by forcing control valve 30 to the downward position, piston 24 moves to a top position whereas closing valve 30 will prevent water flow through passage 79 thereby allowing the helical spring to return piston 24 to its downward position.

A brine tank (not shown) is connected to the water softener valve assembly by means of a tube 84 (FIG. 1) which is connected to the top portion 34 of the housing via hole 85 (FIG. 3). Hole 85 is one end of a passage which opens into an automatic brine valve 86 (FIG. 1). The brine passing through valve 86 exits the valve via hole 87 (FIG. 3) which in turn is one end of a passage which opens at its opposite end into brine inlet passage 88 in communication via passage 89 with the cylindrical cavities 90 and 91 which respectively receive pistons 92 and 93 fixedly mounted to the piston rods respectively of brine intake valve 26 and brine refill valve 27. Pistons 92 and 93 are positioned respectively over cavities 94 and 95 (FIG. 4). Cavities 94 and 95 are elongated having respectively holes 96 and 97 at their opposite ends. Hole 96 opens into passage 98 which in turn empties into the water softener tank (FIG. 6). Hole 97 opens into passage 99 (FIG. 6) which in turn connects with passage 100 which opens into the bypass passage 45 (FIG. 4). By opening brine intake valve 26, piston 92 is forced downwardly into cavity 94 thereby allowing brine from the brine tank to flow through tube 84, valve 86 and into passages 88, 89, cavity 94, passage 98 and then into the water softener tank. Water from passage 45 also flows into passage 98 via hole 46' at end 46 thereby causing a sucking force to be applied to the brine tank. Upon emptying of the brine tank, the brine tank may be refilled with water by opening brine refill valve 27 thereby forcing piston 93 into cavity 95 and allowing water in bypass passage 45 to flow through passages 100 and 99 into cavity 95, and then into passages 89, 88, valve 86 and out tube 84.

Figure 5:
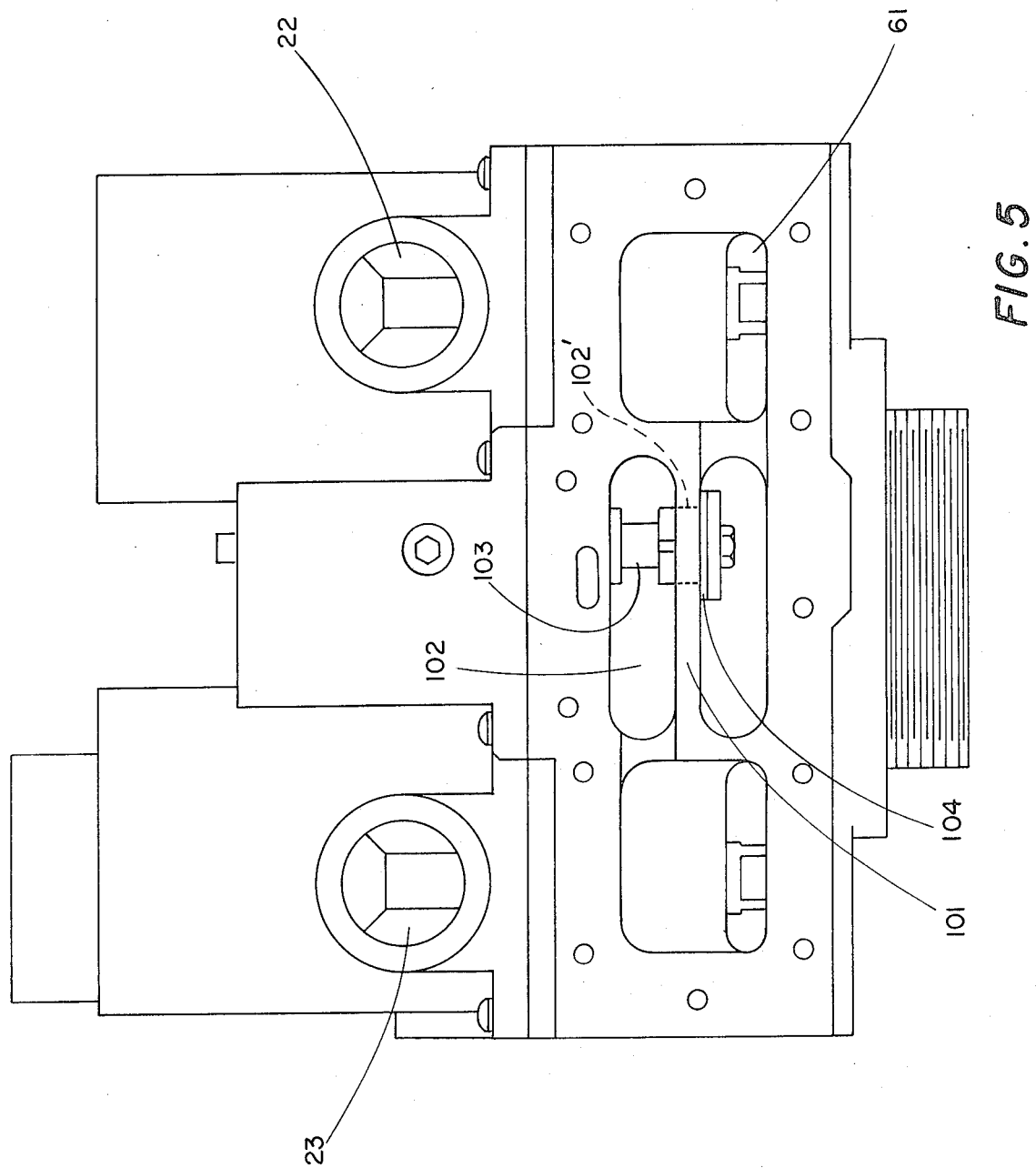
FIG. 5 is an enlarged cross sectional view taken along the line 5—5 of FIG. 1 and viewed in the direction of the arrows.

In order to backwash tank 21, the flow of water is reversed so as to flow downwardly through passage 41 (FIG. 6) and upwardly through passage 40. To achieve the backwash, the bypass valve is opened allowing water to flow from chamber 36 via bypass passage 45 and into chamber 37 exiting the assembly via outlet 23. Control valve 29 is forced to the downward position so as to open piston 71 whereas piston 72 remains in the upward position. Therefore, piston 25 is positioned in the upward position whereas piston 24 is in the downward position both as shown in FIG. 6. The water flowing from the bypass passage and entering chamber 37 therefore flows not only outwardly through outlet 23 but also into passage 41 and down into the water softener tank. The water flowing outwardly from water softener tank 21 then exits the tank via passage 40. Since the bottom end of chamber 36 is sealed, the water flowing from passage 41 must then flow via passage 60 into passage 61 which ends at wall 101 (FIG. 5). Wall 101 is provided with a hole 102' through which rod 103 projects. A rubber seal 104 is fixedly mounted to rod 103 and is movable away from wall 101 allowing the water within chamber 61 to pass through hole 102' into cavity 102 which is connected to the drain outlet. Rod 103 extends upwardly into hole 81 (FIG. 4) and may be forced downwardly by the lower end of the rod attached to control valve 31.

In order to purge any brine from the water softener tank, the right piston control valve 29 is closed allowing the right piston 25 to assume the downward position forcing water into tank 21 via passage 40 and out of tank 21 via passage 41. Left piston control valve 30 is opened allowing piston 24 to assume the upward position thereby forcing liquid from passage 41 into passage 62 which empties to passage 102 (FIG. 5) in turn connected to the drain passage.

Following is a table which shows the positioning of the various valves with respect to the regeneration and softening steps with "C" indicating closed and "O" indicating opened.

|  | Brine intake control valve 26 | Brine refill control valve 27 | Bypass control valve 28 | Right piston control valve 29 | Left piston control valve 30 | Drain control valve 31 |
|---|---|---|---|---|---|---|
| Backwash | C | C | O | O | C | O |
| Brine | O | C | O | O | O | C |
| Slow Rinse | C | C | O | O | O | C |
| Brine Refill | C | O | O | No effect on brine refill | | |
| Purge | C | C | O | C | O | O |
| Soften | C | C | C | C | C | O |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A water softener valve assembly comprising:
    a housing having a first chamber and a second chamber each with a first end and an opposite end, said housing having a first passage leading from said first end of said first chamber to a water softener tank, a second passage leading from said water softener tank to said second chamber, a bypass passage leading from said first chamber to said second chamber, a hard water inlet opening into said first chamber, a soft water outlet opening into said second chamber, a third control passage leading from said opposite end of said first chamber, and a fourth control passage leading from said opposite end of said second chamber;
    a bypass valve mounted on said housing and projecting into said bypass passage being movable to and from a position blocking water flow in said bypass passage and another position allowing water flow in said bypass passage;
    a first piston mounted in said first chamber and slidable to and from an open and closed position, said first piston having an end with a first seal and another end with a second seal mounted thereon, said hard water inlet and said bypass passage open into said first chamber between said first seal and said second seal, said first seal sealingly engages said first end of said first chamber when said first piston is in the closed position preventing water flow into said first passage;
    first means mounted on said housing operable to move said first piston to and from its opened and closed positions;
    a second piston mounted in said second chamber and slidable to and from opened and closed positions, said second piston having an end with a third seal and another end with a fourth seal mounted thereon, said soft water outlet and said bypass passage open into said second chamber between said third seal and said fourth seal, said third seal sealingly engages said first end of said second chamber when said second piston is in its closed position; and,
    second means mounted on said housing operable to move said second piston to and from its open and closed positions.

2. The water softener valve assembly of claim 1 wherein:
    said first means includes a first spring, a first pressure equalizing passage and a first control valve, said first spring is mounted at said opposite end of said first chamber and contacts an end of said first piston normally urging said first piston to its open position allowing water flow into said first passage, said equalizing passage has opposite ends opening on opposite sides of said second seal, said first control valve is mounted on said housing and projects into said third control passage with a position to block water flow therein and another position to allow water to escape said opposite end of said first chamber via said third control passage with incoming water pressure within said first chamber forcing said first piston to its closed position.

3. The water softener valve assembly of claim 2 wherein:
    said second means includes a second spring, a second pressure equalizing passage and a second control valve, said second spring is mounted at said opposite end of said second chamber and contacts an end of said second piston normally urging said second piston to its open position allowing water flow into said second passage, said second equalizing passage has opposite ends opening on opposite sides of said fourth seal, said second control valve is mounted on said housing and projects into said fourth control passage with a position to block water flow therein and another position to allow water to escape said opposite end of said second chamber via said fourth control passage with water pressure in said second chamber forcing said second piston to its closed position.

4. The water softener valve assembly of claim 1 wherein:
    said first chamber is straight without bends;
    said first passage has a maximum of one bend between said first chamber and said water softener tank;
    said second passage has a maximum of one bend between said water softener tank and said second chamber; and,
    said second chamber is straight without bends.

5. The water softener valve assembly of claim 2 wherein:
    said first equalizing passage is positioned on said first piston.

6. The water softener valve assembly of claim 3 wherein:
    said second equalizing passage is a groove in said second chamber extending on either side of said fourth seal.

7. The water softener valve assembly of claim 6 wherein:
    said housing includes a brine inlet, a brine inlet passage leading from said brine inlet and into said water softener tank, said housing includes a brine refill passage leading from said bypass passage to said brine inlet passage; and further comprising:
    a brine intake valve and a brine refill valve mounted to said housing and projecting into said brine inlet passage and both having a closed position preventing liquid flow through said brine inlet passage, said brine intake valve having an open position allowing liquid flow through said brine inlet passage to said water softener tank, said brine refill valve having an open position allowing liquid flow through said brine refill passage through said brine inlet passage.

8. The water softener valve assembly of claim 7 wherein:

said housing includes a drain outlet, a fifth passage leading from said first passage to said drain outlet and a sixth passage leading from said second passage to said drain outlet;

said first piston in its open position blocks liquid flow with said first seal from said first passage to said fifth passage and when closed allows liquid flow from said first passage to said fifth passage;

said second piston in its open position blocks liquid flow with said third seal from said second passage to said sixth passage and when closed allows liquid flow from said second passage to said sixth passage and further comprising:

a drain valve mounted to said housing and projecting into said fifth passage having an open position allowing liquid flow from said fifth passage to said drain outlet and having a closed position preventing liquid flow from said fifth passage to said drain outlet.

\* \* \* \* \*